US012646478B2

(12) United States Patent
Lin et al.

(10) Patent No.: US 12,646,478 B2
(45) Date of Patent: Jun. 2, 2026

(54) MONITOR, SCALER, AND POWER CONSUMPTION REDUCTION METHOD

(71) Applicant: Realtek Semiconductor Corporation, Hsinchu (TW)

(72) Inventors: Yuh Wey Lin, Hsinchu (TW); Yu-Pin Chou, Hsinchu (TW); Tzuo-Bo Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 19/053,392

(22) Filed: Feb. 13, 2025

(65) Prior Publication Data

US 2026/0065871 A1 Mar. 5, 2026

(30) Foreign Application Priority Data

Aug. 29, 2024 (TW) ................................ 113132713

(51) Int. Cl.
*G09G 3/36* (2006.01)
*G09G 3/34* (2006.01)

(52) U.S. Cl.
CPC ............ *G09G 3/36* (2013.01); *G09G 3/3406* (2013.01); *G09G 2320/02* (2013.01); *G09G 2330/021* (2013.01)

(58) Field of Classification Search
CPC ........................................................ G09G 3/36
USPC ........................................................ 345/690
See application file for complete search history.

(56) References Cited

U.S. PATENT DOCUMENTS

2015/0130861 A1* 5/2015 Lee ...................... G09G 3/3406 345/691
2015/0199940 A1* 7/2015 Qiu ...................... G09G 3/3406 345/691
2015/0264775 A1* 9/2015 Soe ...................... G09G 3/3406 315/86

FOREIGN PATENT DOCUMENTS

TW 202420288 A 5/2024

* cited by examiner

*Primary Examiner* — Long D Pham
(74) *Attorney, Agent, or Firm* — CKC & Partners Co., LLC

(57) ABSTRACT

A monitor includes a display device, a current sensing device, and a scaler. The current sensing device is configured to detect a total current to generate current information when a power source of the monitor is a non-utility power source device. The scaler is coupled to the current sensing device and the display device. The scaler is configured to perform a power consumption reduction process on the display device according to the current information.

16 Claims, 2 Drawing Sheets

MONITOR, SCALER, AND POWER CONSUMPTION REDUCTION METHOD

RELATED APPLICATIONS

This application claims priority to Taiwanese Application Serial Number 113132713, filed Aug. 29, 2024, which is herein incorporated by reference.

BACKGROUND

Technical Field

The present disclosure relates to monitor technology. More particularly, the present disclosure relates to a monitor, a scaler, and a power consumption reduction method that can adaptively reduce power consumption.

Description of Related Art

With developments of technology, various monitors have been developed to display dynamic images or static images. For example, portable monitors and desktop monitors have different characteristics and advantages. However, due to high power consumption of the desktop monitors, the desktop monitors are generally powered by utility power. Therefore, environments where the desktop monitors can be used are relatively limited.

SUMMARY

Some aspects of the present disclosure are to provide a monitor. The monitor includes a display device, a current sensing device, and a scaler. The current sensing device is configured to detect a total current to generate current information when a power source of the monitor is a non-utility power source device. The scaler is coupled to the current sensing device and the display device. The scaler is configured to perform a power consumption reduction process on the display device according to the current information.

Some aspects of the present disclosure are to provide a scaler. The scaler includes a micro control unit circuit. The micro control unit circuit is configured to receive current information, wherein the current information is generated by a current sensing device to detect a total current when a power source of a monitor is a non-utility power source device. The micro control unit circuit is further configured to perform a power consumption reduction process on a display device in the monitor according to the current information.

Some aspects of the present disclosure are to provide a power consumption reduction method. The power consumption reduction method includes following operations: receiving, by a micro control unit circuit in a scaler, current information, wherein the current information is generated by a current sensing device to detect a total current when a power source of a monitor is a non-utility power source device; and performing, by the micro control unit circuit, a power consumption reduction process on a display device in the monitor according to the current information.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
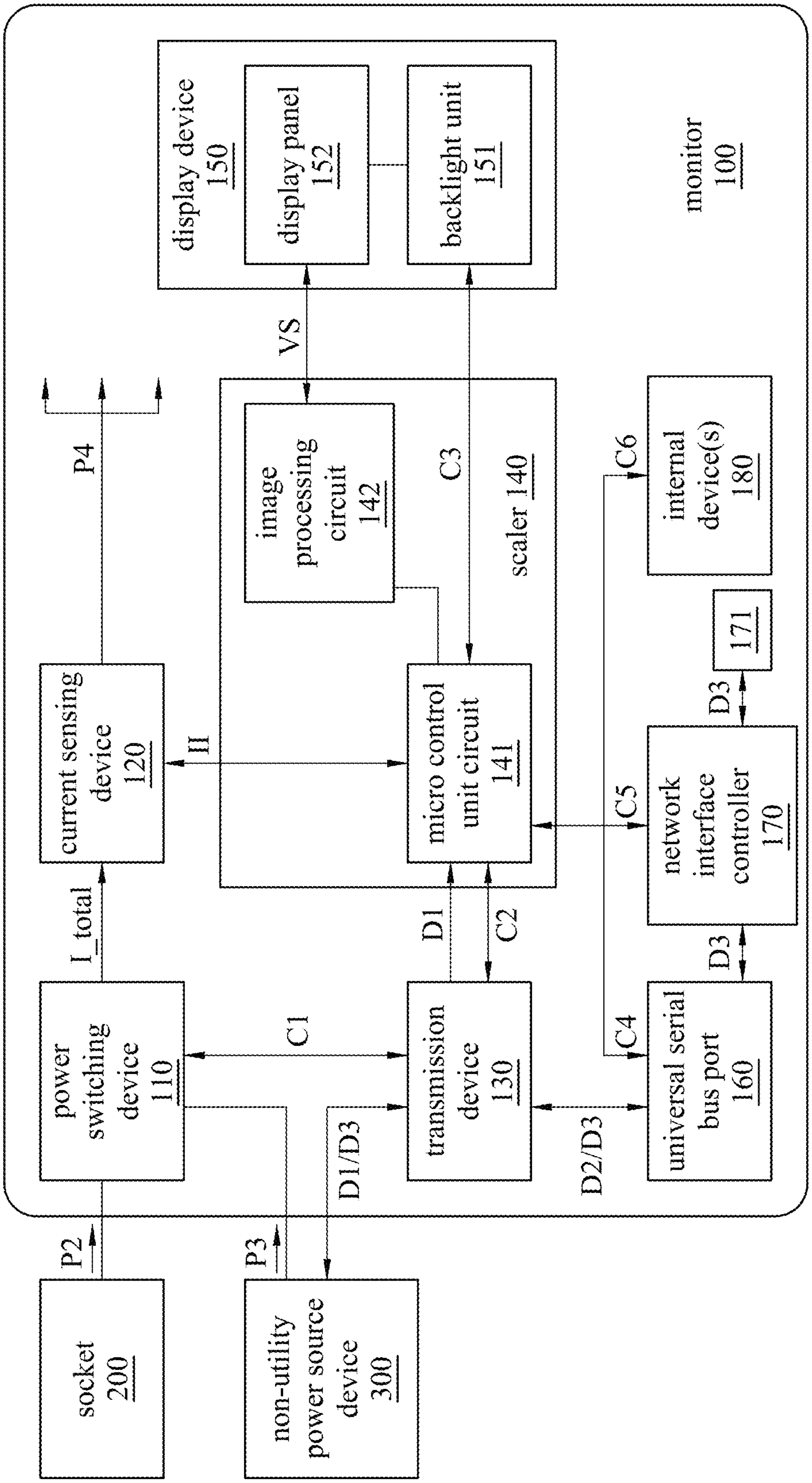
FIG. 1 is a schematic diagram of a monitor according to some embodiments of the present disclosure.

Reference is made to FIG. 1. FIG. 1 is a schematic diagram of a monitor 100 according to some embodiments of the present disclosure.

As illustrated in FIG. 1, the monitor 100 can be coupled to a socket 200 or a non-utility power source device 300. In other words, a power source of the monitor 100 can be utility power P2 from the socket 200 or non-utility power P3 from the non-utility power source device 300. The non-utility power source device 300 can be a laptop computer or other portable electronic devices. In some other embodiments, the non-utility power source device 300 can be a personal desktop computer or other electronic devices that can provide the non-utility power P3. In generally, power of the non-utility power P3 is less than power of the utility power P2.

The monitor 100 includes a power switching device 110, a current sensing device 120, a transmission device 130, a scaler 140, a display device 150, a universal serial bus (USB) port 160, a network interface controller (NIC) 170, a network interface 171, and one or more internal devices 180.

Regarding coupling relationships, the power switching device 110 is coupled to the socket 200 or the non-utility power source device 300. The power switching device 110 is further coupled to the current sensing device 120 and the transmission device 130. The current sensing device 120 is coupled to the scaler 140. The transmission device 130 is coupled to the scaler 140 and the universal serial bus port 160. The scaler 140 is coupled to the display device 150, the universal serial bus port 160, the network interface controller 170, and the one or more internal devices 180. The universal serial bus port 160 is coupled to the network interface controller 170. The network interface controller 170 is coupled to the network interface 171.

The power switching device 110 can receive the utility power P2 from the socket 200 or the non-utility power P3 from the non-utility power source device 300. The power switching device 110 can be implemented by a switching circuit and a buck circuit. The switching circuit can be used to switch power source path to select the utility power P2 or the non-utility power P3. In addition, a voltage of the utility power P2 is 110 volts. When the power switching device 110 receives the utility power P2, the buck circuit in the power switching device 110 can reduce the voltage of the utility power P2.

The current sensing device 120 can receive a total current I_total from the power switching device 110, and provide power P4 according to the total current I_total to circuits or components that needs power in the monitor 100. In addition, the current sensing device 120 can detect the total current I_total to generate current information II. The total current I_total can reflect overall power consumption of the monitor 100.

The transmission device 130 can receive data D1 from the non-utility power source device 300 by using a specific bit rate and a specific lane count, and transmit the data D1 to the scaler 140 with the specific bit rate and the specific lane count. The lane count means the quantity of channels for transmitting data. The transmission device 130 can further send a control signal C1 to control the power switching device 110. The transmission device 130 can be implemented by a power delivery (PD) circuit and a multiplexer.

The scaler 140 includes a micro control unit circuit 141 and an image processing circuit 142. The micro control unit circuit 141 is coupled to the image processing circuit 142. The micro control unit circuit 141 is further coupled to the current sensing device 120, the transmission device 130, the display device 150, the universal serial bus port 160, the network interface controller 170, and the one or more internal devices 180.

The micro control unit circuit 141 can receive the current information II from the current sensing device 120, and receive the data D1 from the transmission device 130. The micro control unit circuit 141 can further send a control signal C2 to control the transmission device 130, send a control signal C3 to control the display device 150, send a control signal C4 to control the universal serial bus port 160, send a control signal C5 to control the network interface controller 170, and send a control signal C6 to control the one or more internal devices 180. The image processing circuit 142 can send an image data signal VS.

In an example that the display device 150 is a crystal display device, the display device 150 includes a backlight unit (BLU) 151 and a display panel 152. The display panel 152 is a crystal panel and disposed at a side of the backlight unit 151. The crystal panel includes a crystal layer, a color filter, and other components. In some other embodiments, the display device 150 can be other various display devices. For example, the display device 150 can be an organic light-emitting diode (OLED) display device without the backlight unit 151.

A universal serial bus device can be plugged in the universal serial bus port 160. The non-utility power source device 300 can perform a read operation or a write operation on data D2 for the universal serial bus device plugged in the universal serial bus port 160 through the transmission device 130.

The network interface controller 170 can be connected to a server or a website through the network interface 171 and cables to have networking functions. Data D3 from the server or the website can be transmitted to the non-utility power source device 300 through the network interface 171, the network interface controller 170, the universal serial bus port 160, and the transmission device 130. The network interface 171 can be implemented by a RJ45 interface. In some other embodiments, the monitor 100 can also have wireless networking functions.

The internal devices 180 can be, for example, a camera, a speaker, or other devices.

Figure 2:
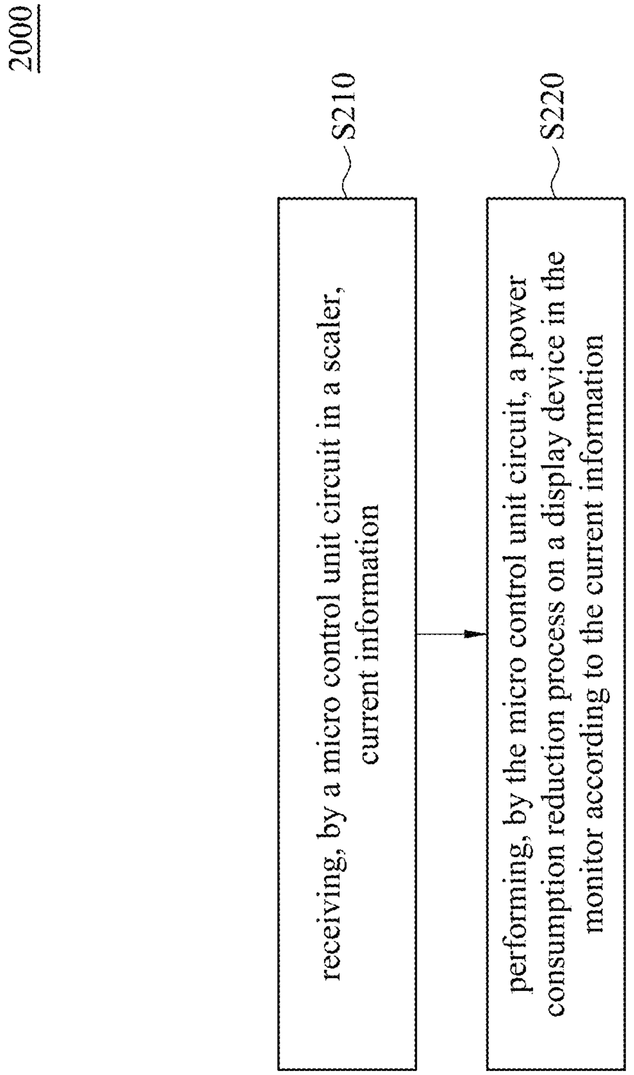
FIG. 2 is a flow diagram of a power consumption reduction method according to some embodiments of the present disclosure.

Reference is made to FIG. 2. FIG. 2 is a flow diagram of a power consumption reduction method 2000 according to some embodiments of the present disclosure. As illustrated in FIG. 2, the power consumption reduction method 2000 includes operation S210 and operation S220.

In some embodiments, the power consumption reduction method 2000 is applied to the monitor 100 in FIG. 1, but the present disclosure is not limited thereto. For better understanding, the power consumption reduction method 2000 is described in following paragraphs with reference to FIG. 1.

Compared to the utility power P2, the power of the non-utility power P3 is insufficient. With the power consumption reduction method 2000, the monitor 100 can still maintain better performance when its power source is the non-utility power P3.

In operation S210, the micro control unit circuit 141 in the scaler 140 receives the current information II. At first, the micro control unit circuit 141 can communicate with the transmission device 130 through an inter-integrated circuit (I2C) bus to know the power source of the monitor 100 through the power switching device 110. When the power source of the monitor 100 is the non-utility power source device 300, it represents that the power of the monitor 100 is insufficient. The current sensing device 120 detects the total current I_total from the power switching device 110 to generate the current information II. In other words, the current information II carries contents of the total current I_total. The current sensing device 120 transmits the current information II to the micro control unit circuit 141.

In operation S220, the micro control unit circuit 141 performs the power consumption process on the display device 150 in the monitor 100 according to the current information II.

The micro control unit circuit 141 can compares the total current I_total in the current information II with a current threshold. For example, a maximum voltage of the non-utility power P3 can be 5 volts and a maximum current of the non-utility power P3 can be 3 amps. In this condition, the current threshold can be set to be 2.5 amps.

In some embodiments, when the total current I_total is greater than the current threshold, the micro control unit circuit 141 can reduce a brightness of the display device 150 to reduce the overall power consumption of the monitor 100. In the example that the display device 150 is the crystal display device, when the total current I_total is greater than the current threshold, the micro control unit circuit 141 can reduce the brightness of the backlight unit 151 through the control signal C3.

However, in order to maintain user's visual experience, the image processing circuit 142 can perform an image compensation process on (all areas or some areas of) the display panel 152. To be more specific, the image processing circuit 142 can increases a voltage (gain) of the image data signal VS to change a rotation degree of crystal in the crystal layer of the display panel 152 to increase transmittance of the display panel 152. Thus, although the brightness of the backlight unit 151 is reduced, the transmittance of the display panel 152 is increased to compensate clarity of the images such that the user's visual experience will not change too drastically.

In some embodiments, when the power condition of the non-utility power source device 300 changes, the above-mentioned current threshold changes. Taking the non-utility power source device 300 being the laptop computer as an example, when the power of the laptop computer decreases, the above-mentioned current threshold decreases. When the power of the laptop computer increases, the above-mentioned current threshold increases.

In some embodiments, when the total current I_total is greater than the current threshold, the micro control unit circuit 141 can reduce the bit rate between the scaler 140 and the non-utility power source device 300 while maintaining an original resolution and an original frame rate to reduce the overall power consumption of the monitor 100. For example, the scaler 140 performs a handshaking process with the non-utility power source device 300 at first. The data D1 between the non-utility power source device 300 and the scaler 140 is preset to be transmitted with a highest bit rate (e.g., 8G). When the total current I_total is greater than the current threshold, the micro control unit circuit 141 can reduce the bit rate (e.g., 2.7 G) through the control signal C2 for transmitting the data D1.

In some embodiments, when the total current I_total is greater than the current threshold, the micro control unit circuit 141 can reduce a lane count between the scaler 140 and the non-utility power source device 300 while maintaining an original resolution and an original frame rate to reduce the overall power consumption of the monitor 100. For example, the data D1 between the non-utility power source device 300 and the scaler 140 is preset to be transmitted with a first lane count (e.g., 4). When the total current I_total is greater than the current threshold, the micro control unit circuit 141 can reduce the lane count to be a second lane count (e.g., 2) through the control signal C2 for transmitting the data D1.

In some embodiments, the bit rate and the lane count between the scaler 140 and the non-utility power source device 300 can be adjusted simultaneously to more effectively reduce the overall power consumption of the monitor 100.

In some embodiments, when the total current I_total is greater than the current threshold, the micro control unit circuit 141 can reduce a bit rate of the universal serial bus port 160 to reduce the overall power consumption of the monitor 100. To be more specific, when the total current I_total is greater than the current threshold, the micro control unit circuit 141 can reduce the bit rate of the universal serial bus port 160 through the control signal C4 for transmitting the data D2 and the data D3.

In some embodiments, when the total current I_total is greater than the current threshold, the micro control unit circuit 141 can reduce a bit rate of the network interface controller 170 to reduce the overall power consumption of the monitor 100. To be more specific, when the total current I_total is greater than the current threshold, the micro control unit circuit 141 can reduce the bit rate of the network interface controller 170 through the control signal C5 for transmitting the data D3.

In some embodiments, when the total current I_total is greater than the current threshold, the micro control unit circuit 141 turns off the internal device 180 to reduce the overall power consumption of the monitor 100. Taking the internal device 180 being a camera as an example, when the total current I_total is greater than the current threshold, the micro control unit circuit 141 can disable the camera through the control signal C6. Taking the internal device 180 being a speaker as an example, when the total current I_total is greater than the current threshold, the micro control unit circuit 141 can disable the speaker through the control signal C6. In some other embodiments, the micro control unit circuit 141 can merely reduce the volume of the speaker.

In some embodiments, priority of the above-mentioned power consumption reduction processes can be to adjust the brightness of the display device 150, to reduce the bit rate or the lane count between the scaler 140 and the non-utility power source device 300, to reduce the bit rate of the universal serial bus port 160 or the network interface controller 170, and then to turn off the internal device 180. In other words, the micro control unit circuit 141 adjusts the brightness of the display device 150 at first. After the brightness of the display device 150 is adjusted, the micro control unit circuit 141 reduces the bit rate or the lane count between the scaler 140 and the non-utility power source device 300 when the total current I_total is still greater than the current threshold. After the bit rate or the lane count between the scaler 140 and the non-utility power source device 300 is adjusted, the micro control unit circuit 141 reduces the bit rate of the universal serial bus port 160 or the network interface controller 170 when the total current I_total is still greater than the current threshold. After the bit rate of the universal serial bus port 160 or the network interface controller 170 is adjusted, the micro control unit circuit 141 turns off the internal device 180 when the total current I_total is still greater than the current threshold.

In some embodiments, before the above-mentioned power consumption reduction processes are performed, the display device 150 can display an on-screen display (OSD) menu to conform to the user whether to perform the above-mentioned power consumption processes. When the user conforms to perform the above-mentioned power consumption processes, the micro control unit circuit 141 performs corresponding operations.

In some related approaches, since power of a non-utility power source device is insufficient, the non-utility power source device can only provide power to monitors with a smaller size, with a lower brightness, or with fewer functions.

Compared to the related approaches above, the scaler 140 in the present disclosure can adaptively manage (reduce) the power consumption of the monitor 100 when the power source of the monitor 100 is the non-utility power P3. Accordingly, the monitor 100 can be a display screen with a larger size, with a higher brightness, and with more functions. For example, the monitor 100 can be a display screen with a size of 24 inches or more than 24 inches, a brightness of 350 nits or more than 350 nits, and with functions of universal serial bus data transmission and networking connection.

As described above, the micro control unit circuit 141 can know the power source of the monitor 100 through the transmission device 130 and the power switching device 110. When the power source of the monitor 100 is the utility power P2, it represents that the monitor 100 has sufficient power. The micro control unit circuit 141 can control the backlight unit 151 to have a maximum brightness through the control signal C3, control the data D1 to be transmitted with a highest bit rate and a maximum lane count though the control signal C2, control the universal serial bus port 160 to have a highest bit rate through the control signal C4, control the network interface controller 170 to have a highest bit rate through the control signal C5, or turn on all of the internal devices 180 through the control signal C6.

As described above, in the present disclosure, the scaler can manage (reduce) the power consumption of the monitor when the power source is the non-utility power source device. Accordingly, the monitor can be a display screen with a larger size, with a higher brightness, and with more functions.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A monitor, comprising:

a display device;

a current sensing device configured to detect a total current to generate current information when a power source of the monitor is a non-utility power source device; and a scaler coupled to the current sensing device and the display device, wherein the scaler is configured to perform a power consumption reduction process on the display device according to the current information, wherein when the total current is greater than a current threshold, the scaler reduces a first bit rate between the scaler and the non-utility power source device or reduces a lane count between the scaler and the non-utility power source device.

2. The monitor of claim 1, wherein the scaler is further configured to compare the total current in the current information with the current threshold, wherein when the total current is greater than the current threshold, the scaler reduces a brightness of the display device to complete the power consumption reduction process.

3. The monitor of claim 2, wherein when a power condition of the non-utility power source device changes, the current threshold changes.

4. The monitor of claim 2, wherein the display device comprises:

a backlight unit; and a display panel disposed at a side of the backlight unit, wherein when the total current is greater than the current threshold, the scaler reduces the brightness of the backlight unit and performs an image compensation process on the display panel to complete the power consumption reduction process.

5. The monitor of claim 2, further comprising:

a universal serial bus port coupled to the scaler, wherein when the total current is greater than the current threshold, the scaler reduces a second bit rate of the universal serial bus port.

6. The monitor of claim 2, further comprising:

a network interface controller coupled to the scaler, wherein when the total current is greater than the current threshold, the scaler reduces a second bit rate of the network interface controller.

7. The monitor of claim 2, further comprising:

an internal device coupled to the scaler, wherein when the total current is greater than the current threshold, the scaler turns off the internal device.

8. A scaler, comprising:

a micro control unit circuit configured to receive current information, wherein the current information is generated by a current sensing device to detect a total current when a power source of a monitor is a non-utility power source device, wherein the micro control unit circuit is further configured to perform a power consumption reduction process on a display device in the monitor according to the current information, wherein when the total current is greater than a current threshold, the micro control unit circuit reduces a first bit rate between the scaler and the non-utility power source device or reduces a lane count between the scaler and the non-utility power source device.

9. The scaler of claim 8, wherein the micro control unit circuit is further configured to compare the total current in the current information with the current threshold, wherein when the total current is greater than the current threshold, the micro control unit circuit reduces a brightness of the display device to complete the power consumption reduction process.

10. The scaler of claim 9, wherein when a power condition of the non-utility power source device changes, the current threshold changes.

11. The scaler of claim 9, further comprising:

an image processing circuit, wherein when the total current is greater than the current threshold, the micro control unit circuit reduces the brightness of a backlight unit in the display device, and the image processing circuit performs an image compensation process on a display panel in the display device to complete the power consumption reduction process.

12. The scaler of claim 9, wherein when the total current is greater than the current threshold, the micro control unit circuit reduces a second bit rate of a universal serial bus port in the monitor.

13. The scaler of claim 9, wherein when the total current is greater than the current threshold, the micro control unit circuit reduces a second bit rate of a network interface controller in the monitor.

14. The scaler of claim 9, wherein when the total current is greater than the current threshold, the micro control unit circuit turns off an internal device in the monitor.

15. The scaler of claim 9, wherein when the non-utility power source device is a portable electronic device.

16. A power consumption reduction method, comprising:

receiving, by a micro control unit circuit in a scaler, current information, wherein the current information is generated by a current sensing device to detect a total current when a power source of a monitor is a non-utility power source device; and performing, by the micro control unit circuit, a power consumption reduction process on a display device in the monitor according to the current information, comprising:

when the total current is greater than a current threshold, reducing, by the micro control unit circuit, a bit rate between the scaler and the non-utility power source device or reducing, by the micro control unit circuit, a lane count between the scaler and the non-utility power source device.

* * * * *